United States Patent
Jain et al.

(10) Patent No.: US 11,673,824 B2
(45) Date of Patent: Jun. 13, 2023

(54) PROCESS AND SYSTEM FOR FORMING CURVED GLASS VIA DIFFERENTIAL HEATING OF EDGE REGION

(71) Applicant: CORNING INCORPORATED, Corning, NY (US)

(72) Inventors: Anurag Jain, Painted Post, NY (US); Nikolaos Pantelis Kladias, Horseheads, NY (US); Zheming Zheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 263 days.

(21) Appl. No.: 16/753,561

(22) PCT Filed: Oct. 5, 2018

(86) PCT No.: PCT/US2018/054700
§ 371 (c)(1),
(2) Date: Apr. 3, 2020

(87) PCT Pub. No.: WO2019/071190
PCT Pub. Date: Apr. 11, 2019

(65) Prior Publication Data
US 2020/0299175 A1 Sep. 24, 2020

Related U.S. Application Data

(60) Provisional application No. 62/568,890, filed on Oct. 6, 2017.

(51) Int. Cl.
*C03B 23/025* (2006.01)

(52) U.S. Cl.
CPC .............. *C03B 23/0258* (2013.01)

(58) Field of Classification Search
None
See application file for complete search history.

(56) References Cited

U.S. PATENT DOCUMENTS

| 3,092,481 A | 6/1963 | Carson |
| 3,251,393 A * | 5/1966 | Beach ............... F23D 11/40 239/501 |

(Continued)

FOREIGN PATENT DOCUMENTS

| DE | 1830124 U | 4/1961 |
| JP | 11263634 A | 9/1999 |

(Continued)

OTHER PUBLICATIONS

Sweet Thermal Conductivity of Inconel 718 and 304 Stainless Steel (Year: 1987).*

(Continued)

*Primary Examiner* — Jodi C Franklin

(57) ABSTRACT

A process and system for forming a curved glass article from a sheet of glass material is provided. The process and system includes supporting a glass sheet on a shaping frame and then heating the sheet of glass material while supported by the shaping frame such that the central region of the sheet of glass material deforms into an open central cavity of the bending frame. The process and/or system are configured such that a steep, localized temperature differential is formed in the region adjacent the outer edge of the glass sheet during the heating stage of the shaping process.

10 Claims, 4 Drawing Sheets

(56) References Cited

U.S. PATENT DOCUMENTS

| | | | |
|---|---|---|---|
| 3,418,098 A | 12/1968 | Kirkman | |
| 3,741,743 A * | 6/1973 | Seymour | C03B 23/023 65/288 |
| 4,119,424 A | 10/1978 | Comperatore | |
| 4,402,767 A * | 9/1983 | Hinze | C03B 37/047 148/676 |
| 4,433,419 A * | 2/1984 | Williamson | H05B 3/03 373/37 |
| 4,747,864 A * | 5/1988 | Hagerty | C03B 11/086 65/102 |
| 4,871,385 A | 10/1989 | Lecourt et al. | |
| 5,118,335 A * | 6/1992 | Claassen | C03B 27/0442 65/288 |
| 5,328,496 A * | 7/1994 | Lesage | C03B 23/023 65/288 |
| 5,383,950 A * | 1/1995 | Hashemi | C03B 35/202 65/288 |
| 5,385,786 A * | 1/1995 | Shetterly | C03B 35/202 428/432 |
| 5,472,470 A * | 12/1995 | Kormanyos | C03B 27/0413 65/374.13 |
| 5,591,245 A | 1/1997 | Salonen | |
| 5,679,124 A * | 10/1997 | Schnabel, Jr. | C03B 35/202 65/273 |
| 5,865,866 A | 2/1999 | Schnabel, Jr. et al. | |
| 6,574,992 B1 * | 6/2003 | Kuster | C03B 27/0404 65/374.13 |
| 6,656,597 B2 | 12/2003 | Takahara | |
| 7,867,633 B2 * | 1/2011 | Moore | C23C 14/027 51/307 |
| 8,429,937 B2 * | 4/2013 | Malach | C03B 23/0252 65/106 |
| 8,800,321 B2 * | 8/2014 | Olivier | C03B 27/0442 65/106 |
| 9,550,695 B2 * | 1/2017 | Immerman | C03B 23/0357 |
| 9,919,496 B2 * | 3/2018 | Michetti | B32B 17/10935 |
| 11,174,188 B2 * | 11/2021 | Palmantier | C03B 35/161 |
| 11,453,612 B2 * | 9/2022 | Roussev | C03C 3/097 |
| 11,459,270 B2 * | 10/2022 | Hu | C03C 3/097 |
| 2005/0166639 A1 | 8/2005 | Skeen et al. | |
| 2010/0000259 A1 * | 1/2010 | Ukrainczyk | C03B 23/0307 65/107 |
| 2014/0206523 A1 * | 7/2014 | Horn | C03B 23/002 65/106 |
| 2014/0224958 A1 * | 8/2014 | Feng | C23C 14/5853 428/457 |
| 2014/0335322 A1 * | 11/2014 | Luo | H05K 5/03 65/273 |
| 2015/0110707 A1 * | 4/2015 | Gadkaree | C01B 32/342 423/460 |
| 2015/0114042 A1 * | 4/2015 | Gaylo | C03B 23/03 65/162 |
| 2015/0218029 A1 * | 8/2015 | Nitschke | C03B 23/0357 65/290 |
| 2015/0321940 A1 * | 11/2015 | Dannoux | C03B 23/0235 65/273 |
| 2017/0081237 A1 * | 3/2017 | Costello, III | C03B 23/0235 |
| 2018/0057389 A1 * | 3/2018 | Feigenblum | C03B 23/0235 |
| 2020/0199006 A1 * | 6/2020 | Jain | C03B 23/0307 |
| 2020/0325058 A1 * | 10/2020 | Burdette | C03B 23/0252 |
| 2022/0204381 A1 * | 6/2022 | Layouni | C03B 23/0256 |

FOREIGN PATENT DOCUMENTS

| | | |
|---|---|---|
| WO | 0236508 A2 | 5/2002 |
| WO | 2015/092385 A1 | 6/2015 |

OTHER PUBLICATIONS

Thermophysical properties of inconel alloy 718 (Year: 2019).*
International Search Report and Written Opinion of the International Searching Authority; PCT/US2018/054700; dated Dec. 21, 2018; 16 Pages; European Patent Office.

* cited by examiner

PROCESS AND SYSTEM FOR FORMING CURVED GLASS VIA DIFFERENTIAL HEATING OF EDGE REGION

CROSS-REFERENCE TO RELATED APPLICATIONS

This application is a national stage application under 35 U.S.C. § 371 of International Application No. PCT/US2018/054700, filed on Oct. 5, 2018, which claims the benefit of priority under 35 U.S.C. § 119 of U.S. Provisional Application Ser. No. 62/568,890 filed on Oct. 6, 2017, the content of which is relied upon and incorporated herein by reference in its entirety.

BACKGROUND

The disclosure relates generally to forming a curved glass article, and specifically to processes forming curved glass articles via a shaping frame utilizing differential heating. Curved glass sheets or articles find use in many applications, particularly as for vehicle or automotive window glass. Typically, curved glass sheets for such applications have been formed from relatively thick sheets of glass material. Applicant has found that traditional shaping processes may produce a variety of undesirable characteristics (e.g., edge wrinkling, over-sagging of glass at the edges, etc.) in the curved glass sheet, the severity of which appears to increase as glass sheet thickness decreases.

SUMMARY

One embodiment of the disclosure relates to a process for forming a curved glass article from a sheet of glass material. The process includes placing an outer region of the sheet of glass material into contact with a support surface of a shaping frame, and the shaping frame defines an open central cavity surrounded at least in part by the support surface. The process includes supporting the sheet of glass material with the shaping frame via the contact between the sheet of glass material and the support surface such that a central region of the sheet of glass material is suspended over the open central cavity of the shaping frame. The process includes heating the sheet of glass material while supported by the shaping frame such that the central region of the sheet of glass material deforms into the open central cavity in a direction away from the support surface of the shaping frame. The sheet of glass material has a spatial temperature profile measured across a width of the sheet of glass material. The temperature profile includes a first section extending from a center point outward toward the outer region, and the first section of the temperature profile has a first average slope. The temperature profile includes a second section extending outward across at least a portion of the outer region, and the second section of the temperature profile has a second average slope. The second average slope is at least three times the first average slope. The process includes cooling the sheet of glass material following heating to form the curved glass article from the sheet of glass material.

An additional embodiment of the disclosure relates to a process for forming a curved glass article from a sheet of glass material. The process includes placing an outer region of the sheet of glass material into contact with a support surface of a shaping frame, and the shaping frame defines an open central cavity surrounded at least in part by the support surface. The process includes supporting the sheet of glass material with the shaping frame via the contact between the sheet of glass material and the support surface such that a central region of the sheet of glass material is suspended over the open central cavity of the shaping frame. The process includes heating the sheet of glass material while supported by the shaping frame such that the central region of the sheet of glass material deforms into the open central cavity in a direction away from the support surface of the shaping frame. The process includes limiting heating experienced by the outer region of the sheet of glass material such that the temperature of the outer region decreases in a direction toward an outer perimeter of the glass sheet at a spatial rate greater than 5 degrees C. per mm. The process includes cooling the sheet of glass material following heating to form the curved glass article from the sheet of glass material.

An additional embodiment of the disclosure relates to a system for forming a curved glass article from a glass sheet. The system includes a support ring. The support ring includes a radially inward facing inner surface defining an open central cavity, a radially outward facing surface, an upper surface surrounding the open central cavity at an upper end of the support ring, and a bottom surface opposite the upper surface. The glass sheet is supported from the upper surface of the support ring with a central region of the glass sheet suspended over the open central cavity of the support ring. The system includes a heating station having a heating chamber, and the support ring is located within the heating chamber. The heating station configured to heat the support ring and the glass sheet such that a central region of the glass sheet sags downward into the open central cavity under gravity. The system is configured to conduct heat away from the sheet of glass material through the contact at the upper surface with the sheet of glass material such that the temperature experienced by the portion of the sheet of glass material in contact with the upper surface of the support ring is at least 30 degrees less than the temperature experienced by the central region of the sheet of glass material.

An additional embodiment of the disclosure relates to a curved glass article made by the method(s) and/or system(s) disclosed herein and/or recited in the claims.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
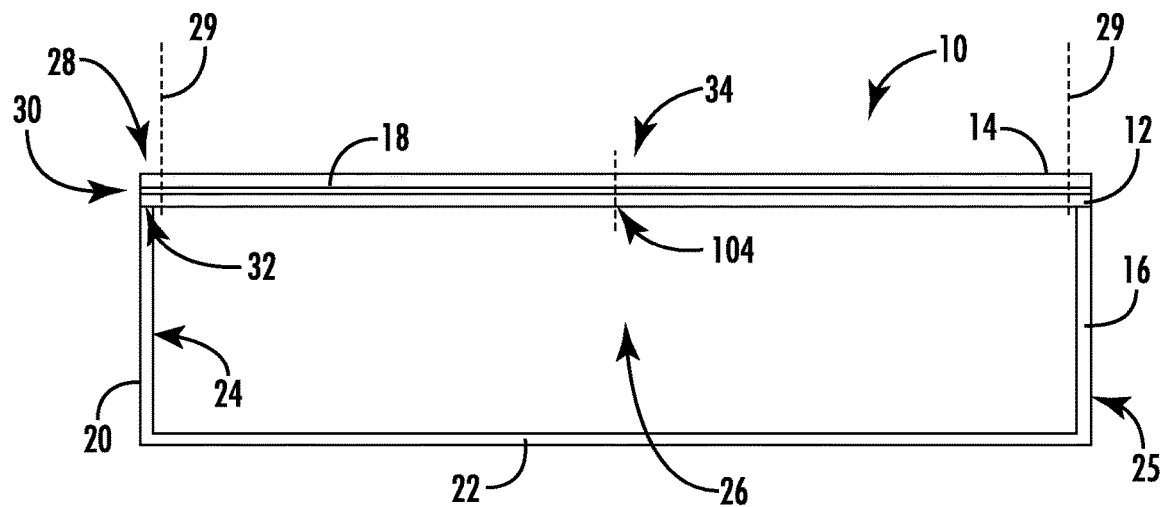
FIG. 1 is a cross-sectional view showing glass sheets supported by a high thermal mass bending ring, according to an exemplary embodiment.

Referring generally to the figures, various embodiments of systems and methods for shaping, bending or sagging glass sheets are shown and described. In general, the systems and methods discussed herein provide for differential heating between the center of a glass sheet and a supported, outer portion of the glass sheet. Specifically, the systems and methods discussed herein produce a sharp and localized temperature drop over a small region adjacent the outer perimeter of the glass sheet(s). As will be discussed in detail herein, Applicant believes this steep-sloped, lower temperature heating of the outer edge region of the glass sheet will improve the quality of the shaped or bent, curved glass article.

In some glass shaping methods one or more glass sheet is supported on a bending ring, and the glass sheet is heated to near the temperature where the viscosity decreases sufficiently to allow sagging (e.g., where viscosity is around $10^{9.9}$ poise). A curved shape is formed in the glass sheet, as gravity pulls the center of the heated, softened glass downward into the bending ring. Applicant has found that certain defects, e.g., edge wrinkling and steep sagging near the edge of the glass sheet (typically referred to in the industry as "bathtub defect"), can be formed during gravity sagging of large sheets of thin glass (e.g., thin, chemical strengthened glass such as Gorilla Glass from Corning Incorporated that may be used for a variety of applications such as vehicle or automotive windows). Applicant has found that defects, such as edge wrinkling and bathtub defect, can be reduced by sharply decreasing the temperature experienced by the outer edge region of the glass sheet as compared to the central portion of the glass sheet.

Specifically, Applicant has performed studies related to the cause of the bathtub defect which show that the presence of membrane stresses during bending are highest at the center of the glass sheet and decrease to zero at the edges. These membrane stresses stiffen the sheet in the middle, resulting in under-sagging at the center relative to the edges. The edges of the glass sheet on the other hand over-sag due to low membrane stresses under gravitational loads. As discussed herein, Applicant has found that the bathtub defect may be addressed by differential heating of the glass sheet with higher central region temperatures and sharply lower temperatures focused on a narrow outer edge region of the glass sheet.

Edge wrinkling (also referred to in the industry as buckling) is a mechanical instability indicated by a sudden change of structure due to bifurcation associated with loss of structural stability. Wrinkling is triggered by compressive stresses reaching above a critical threshold value which is mainly dependent on glass edge stiffness which in-turn depends on glass plate thickness as well as modulus and viscosity of glass at that temperature. Applicant has utilized numerical modeling to show that wrinkling can be mitigated by increasing the edge stiffness by establishing a local thermal gradient near the glass edge, with the glass edge region being locally colder as compared to the center of the glass sheet. This local gradient at the glass edge effectively increases the glass viscosity and modulus of the glass at the edge, and thereby increases its bending stiffness under edge compressive stresses. This in turn decreases the potential for the formation of edge wrinkles.

While a variety of approaches and processes for generating a sharp temperature gradient at the edge of the glass sheet are contemplated, in particular embodiments discussed herein, the temperature gradient may be generated by supporting the glass sheet on a high thermal mass bending ring. In contrast to conventional bending rings that are generally intentionally designed to have low thermal mass (e.g., are small, lightweight, have a variety of through holes, etc.), the bending rings discussed herein are designed to have a relatively large thermal mass. Due to the contact with the edge of the glass sheet, the high thermal mass bending ring conducts heat away from the area near the edge of the glass sheet, resulting in a sharply lower glass temperature at the edge compared to the center. In other specific embodiments, the edge region temperature may be reduced by directing a stream of gas toward the edge of the glass sheet to decrease the temperature of the edge region relative to the rest of the glass sheet. As noted above, this edge-focused temperature gradient is believed to decrease both edge wrinkling and bathtub defects.

Figure 2:
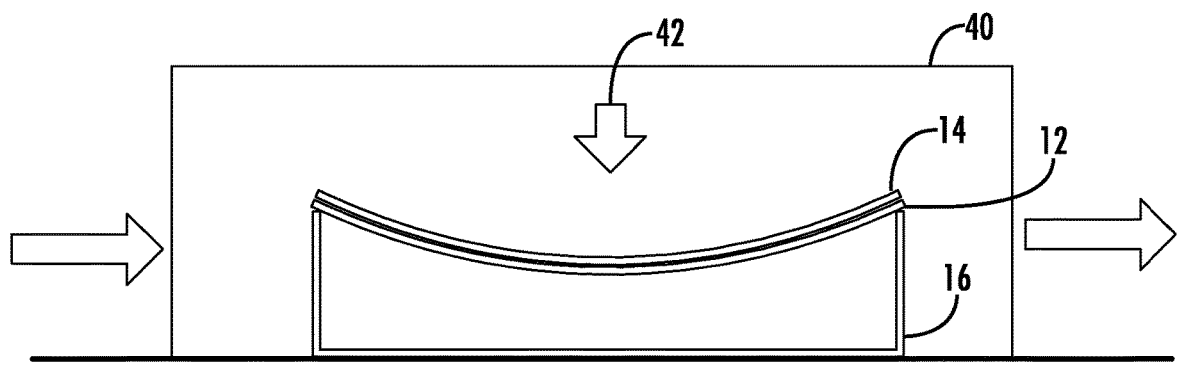
FIG. 2 is a cross-sectional view showing glass sheets supported by a high thermal bending ring within a heating station, according to an exemplary embodiment.

Referring to FIG. 1 and FIG. 2, a system and process for forming a curved glass article is shown according to an exemplary embodiment. In general, system 10 includes one or more sheet of glass material, shown as a pair of glass sheets 12 and 14, supported by a shaping frame, shown as bending ring 16. In one embodiment, bending ring 16 may be used for shaping glass sheets 12 and 14 in a co-sagging arrangement, as shown in FIG. 1, and in such embodiments, a separation material 18 may be utilized between glass sheets 12 and 14 to prevent them from bonding together. In other embodiments, a single glass sheet, such as glass sheet 12, may be supported by bending ring 16, and shaped into a curved shape as discussed herein. Further, it should be understood that bending ring 16 may have a wide variety of shapes selected based on the shape of the glass sheet to be supported, and use of the term ring does not necessarily denote a circular shape.

As shown in FIG. 1, bending ring 16 includes a support wall, shown as sidewall 20, and a bottom wall 22. Sidewall 20 extends upward and away from bottom wall 22. The radially inward facing surface 24 of sidewall 20 defines an open central region or cavity 26, and an upward facing surface of bottom wall 22 defines the lower end of cavity 26. A radially outward facing surface 25 is opposite of inward facing surface 24.

To begin the shaping process, an outer region 28 of glass sheet 12 adjacent the outer perimeter edge 30 of the glass sheet is placed into contact with a support surface, shown as upward facing surface 32, of bending ring 16. In general, outer region 28 is represented by the area outside of dashed line 29 and represents a small width portion of glass sheets 12 and/or 14. In this arrangement, glass sheet 12 is supported by the contact between upward facing surface 32 and glass sheet 12 such that a central region 34 of glass sheet 12 is supported over central cavity 26.

Next, bending ring 16 and supported glass sheets 12 and/or 14 are moved into a heating station 40, such as an oven or serial indexing lehr. Within heating station 40, glass sheets 12 and/or 14 and bending ring 16 are heated (e.g., to the temperature where the viscosity is around $10^{99}$ poise for the glass material of glass sheets 12 and 14) while glass sheets 12 and 14 are supported on bending ring 16. As glass sheets 12 and 14 are heated, a shaping force, such as the downward force 42, causes central region 34 of glass sheets 12 and 14 to deform or sag downward into central cavity 26 of bending ring 16. In specific embodiments, the downward force is provided by gravity. In some embodiments, the downward force may be provided via air pressure (e.g., creating a vacuum on the convex side of glass sheets 12 and 14, blowing air on the concave side of glass sheets 14, via press or other contact based molding machine, etc.) Regardless of the source of the deforming force, this procedure results in glass sheets having a curved shape as shown in FIG. 2.

After a period of time determined to allow glass sheets 12 and 14 to develop the desired curved shape, bending ring 16 along with the supported glass sheets 12 and/or 14 are then cooled to room temperature. Thus, the shaped, deformed or curved glass sheets 12 and 14 are allowed to cool, fixing glass sheets 12 and 14 into the curved shape created within heating station 40. Once cooled, curved glass sheets 12 and 14 are removed from bending ring 16 and another set of flat glass sheets are placed onto bending ring 16, and the shaping process is repeated.

In conventional processes, all portions of glass sheets and the supporting, bending ring are heated at generally the same rate and to generally the same temperatures during the heating stage of the shaping process. As noted above, Applicant has determined that by differentially heating outer region 28 and central region 34 of glass sheets 12 and 14, various defects, such as bathtub defect and edge wrinkle, can be reduced or eliminated. Thus, in general, system 10 discussed herein is configured such that outer region 28 of glass sheet 12 and/or 14 experiences a sharp, localized temperature decrease relative to the temperature experienced by central region 34 of glass sheet 12 and/or 14.

In specific embodiments, system 10 is configured such that the average temperature experienced by the relatively small outer region 28 of glass sheet 12 and/or 14 during heating within heating station 40 is less than the average temperature experienced by central region 34 of glass sheet 12 and/or 14 during heating within heating station 40. As discussed regarding FIG. 8, in specific embodiments, the slope of the temperature profile of outer region 28 is substantially greater than a slope of the temperature profile of central region 34. In specific embodiments, system 10 is configured such that the average temperature experienced by outer region 28 of glass sheet 12 and/or 14 is at least 30 degrees C. less than the average temperature experienced by central region 34 of glass sheet 12 and/or 14 during heating within heating station 40, and this temperature differential is achieved across a relatively small portion of the total width of glass sheets 12 and/or 14. In an even more specific embodiment, system 10 is configured such that the average temperature experienced by outer region 28 of glass sheet 12 and/or 14 during heating within heating station 40 is 30 to 40 degrees C. less than the average temperature experienced by central region 34 of glass sheet 12 and/or 14 during heating within heating station 40.

In other exemplary embodiments, system 10 is configured such that the heating rate experienced by outer region 28 of glass sheet 12 and/or 14 is less than the heating rate experienced by central region 34 of glass sheet 12 and/or 14 during heating within heating station 40. In other exemplary embodiments, system 10 is configured such that the maximum temperature experienced by outer region 28 of glass sheet 12 and/or 14 is less than the maximum temperature experienced by central region 34 of glass sheet 12 and/or 14 during heating within heating station 40.

While there are a variety of ways to create a localized, edge temperature differential contemplated herein, in particular embodiments discussed herein, bending ring 16 is configured such that the differential heating between outer region 28 and central region 34 of the glass sheet(s) is created by conducting heat from outer region 28 into bending ring 16 through the contact at upper surface 32. In general, this heat conduction-based temperature differential may be provided by designing bending ring 16 to have a high thermal mass. In this design, bending ring 16 acts as a heat sink, slowing the heating rate of the areas of glass sheets 12 and/or 14 close to upper surface 32 compared to the heating rate that central region 34 experiences within heating station 40. As will be generally understood, the thermal mass and heat transfer characteristics of bending ring 16 can be designed to account for a variety of application specific factors, such as the thickness of the glass sheets, the glass material being shaped, the desired shape characteristics, the heating profile of the heating station, etc. In specific embodiments, due to increased susceptibility to defect formation during shaping, thin glass sheets (such as glass sheets having an average thickness less than 1.0 mm) bending using conventional bending ring designs is believed to produce unsatisfactory results, and Applicant believes that the high thermal mass designs for bending ring 16 discussed herein may address such defects and be particularly suitable for forming curved, thin glass sheets.

In specific embodiments, high thermal mass bending ring 16 is formed from a material having a low thermal diffusivity. In one specific embodiment, bending ring is formed from a material having a thermal diffusivity of less than $2\times10^{-5}$ m$^2$/s. In another specific embodiment, bending ring is formed from a material having a thermal diffusivity of less than $4\times10^{-6}$ m$^2$/s. In specific embodiments, bending ring 16 is formed from one or more of the materials listed in Table 1 below.

TABLE 1

| Material | Density (Kg/m$^3$) | Specific heat (J/Kg ° C.) | Thermal Conductivity (W/m ° C.) | Thermal Diffusivity (m$^2$/s) |
| --- | --- | --- | --- | --- |
| SS 304 | 8027 | 502 | 16.26 | 4.03519E−06 |
| Iron Cast | 7920 | 456 | 55 | 1.5229E−05 |
| Incolloy 800 | 7950 | 544 | 14.8 | 3.42212E−06 |
| Nickel (80% Ni 20% Cr) | 8314 | 444 | 12.6 | 3.41332E−06 |
| Steel, Nickel Ni 40% | 8618 | 460 | 10 | 2.52253E−06 |
| Inconel | 8440 | 502 | 15.3 | 3.61115E−06 |

Figure 3:
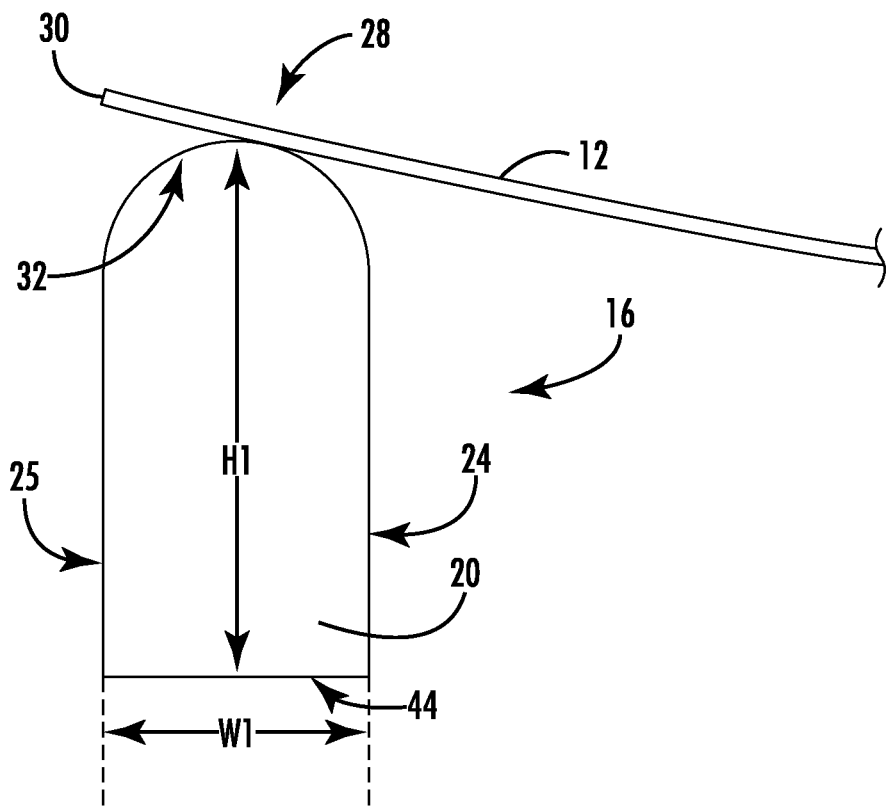
FIG. 3 is a detailed view of the contact location between a glass sheet and a high thermal mass bending ring, according to an exemplary embodiment

Instead of or in addition to utilizing low thermal diffusivity material, bending ring 16 may be shaped or structured in one or more ways to improve heat conduction away from outer region 28 of glass sheet 12 and/or 14. A detailed view of contact between upper surface 32 of bending ring 16 and glass sheet 12 is shown in FIG. 3. In the embodiment shown in FIG. 3, sidewall 20 of bending ring 16 is shaped to be substantially larger than conventional bending rings, which tend to be designed to be small and lightweight. This increased size of bending ring 16 results in bending ring 16 having a larger thermal mass, which in turn facilitates creation of one or more of the steep edge region temperature differentials during heating as discussed herein.

As shown in FIG. 3, bending ring 16 has a height, H1, measured between upper surface 32 and the lower surface 44 of bending ring 16 (which may be a lower surface of sidewall 20 or a lower surface of bottom wall 22). In general, H1 is greater than 20 mm, and specifically may be greater than 30 mm. Thus, the height of sidewall 20 of bending ring 16 is larger than the height of typical bending rings which typically have a height between 10 mm and 20 mm. In a specific embodiment, H1, represents the average height of bending ring 16 measured around the full circumferential length of upper surface 32.

As shown in FIG. 3, bending ring 16 has a width, W1, measured between inward facing surface 24 and outward facing surface 25 of bending ring 16 (which may be measured through the vertical center point of sidewall 20 in the case of a sidewall with a varying thickness). In general, W1 is greater than 3 mm, and specifically may be greater than 4 mm. Thus, the width of sidewall 20 of bending ring 16 is larger than the width of typical bending rings which typically have a width between 2 mm and 3 mm. In a specific embodiment, W1 represents the average width of sidewall 20 measured around the full perimeter of sidewall 20 and averaged over the height of sidewall 20.

In various embodiments, the outer surfaces of bending ring 16 may be coated with a reflective material. Applicant believes that coating bending ring 16 with a reflective material will reduce the amount of heating that ring 16 will experience during the bending cycle that may otherwise be caused by radiation heat transfer from the furnace heaters. In specific embodiments, a reflective material is applied to at least a portion of the walls of ring 16. This can be accomplished by applying a reflective material to the inner surface 24, outer surface 25 and/or upper surface 32 of bending ring 16. In various embodiments, one or more surface of bending ring 16 maybe coated with a reflective material to achieve a low emissivity of 0.4 or less. In one exemplary embodiment, wall(s) 20 of ring 16 are made of INCONEL 600 alloy, and gold is deposited on the wall(s) by first spraying the wall(s) with a suspension of silicon carbide powder in epoxy resin, followed by vacuum deposition of gold.

In addition to increasing the amount/type of material used to form bending ring 16, Applicant believes that the shape and/or structure of bending ring 16 may be configured to improve heat conduction. Referring to the embodiment of FIG. 4, bending ring 16 may be formed from a solid contiguous piece of metal material. In contrast to some conventional bending rings that include holes formed through the ring sidewall, utilizing a solid, heat conducting material for bending ring 16 increases the thermal mass of bending ring 16. Further, the solid structure of sidewall 20 provides a conductive path from support surface 32 to bottom wall 22 facilitating conduction of heat to the full mass of bending ring 16.

Figure 4:
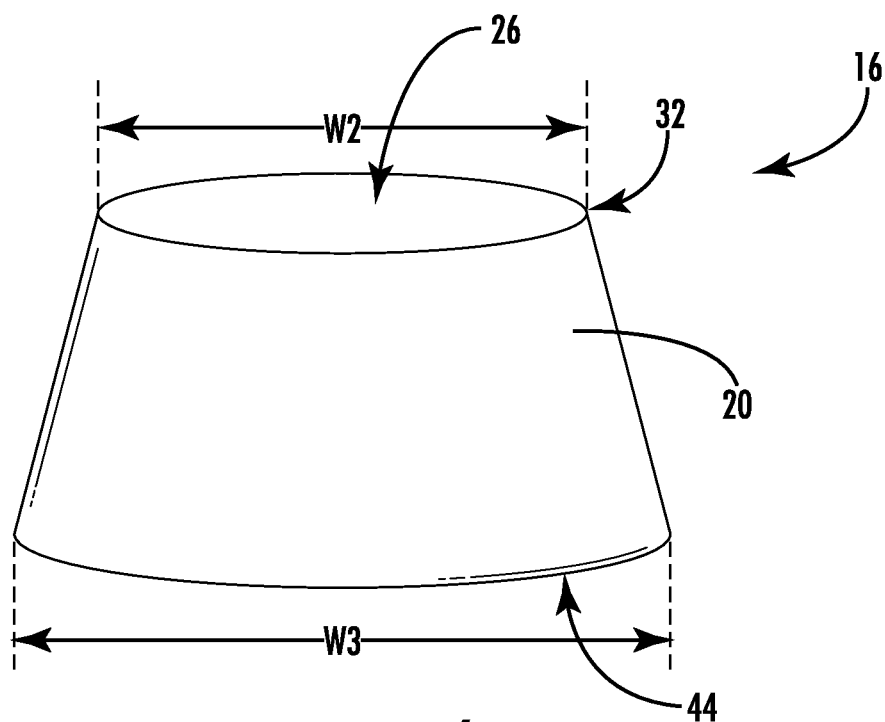
FIG. 4 is a perspective view of a high thermal mass bending ring, according to an exemplary embodiment.

Further, as shown in FIG. 4, bending ring 16 may be formed to have a tapered shape. In this arrangement the average outer width, W2, measured at upper surface 32, is less than the average outer width, W3, measured across bottom surface 44. As can be seen, this arrangement allows bending ring 16 to support a glass sheet having the smaller dimensions set by W2, while adding extra thermal mass to the bottom of bending ring 16.

Figure 5:
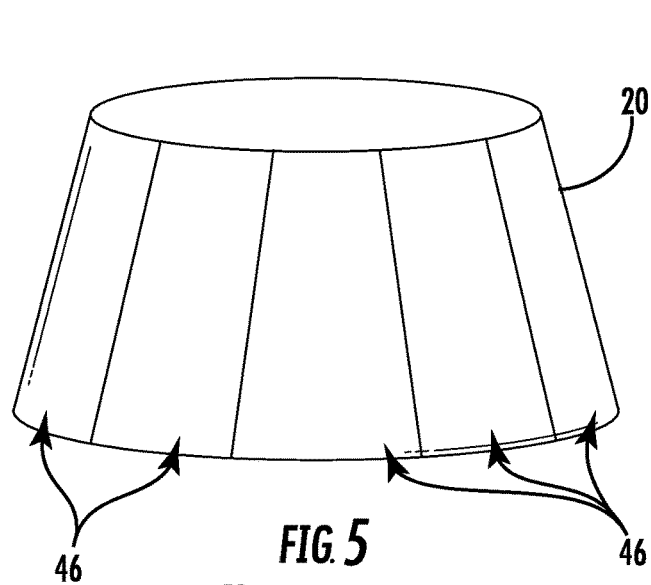
FIG. 5 is a perspective view of a high thermal mass bending ring, according to an exemplary embodiment.

Referring to FIG. 5, in another embodiment, sidewall 20 of bending ring 16 may include one or more removable panels, shown as panels 46. In the embodiment shown, a plurality of removable panels 46 form the entire sidewall 20. In general, the removable panels 46 enable preferential cooling at desired glass locations. Specifically, the design shown in FIG. 5 allows for the introduction of different thermal gradients at locations of the glass sheet which have the highest tendency to wrinkle.

Figure 6:
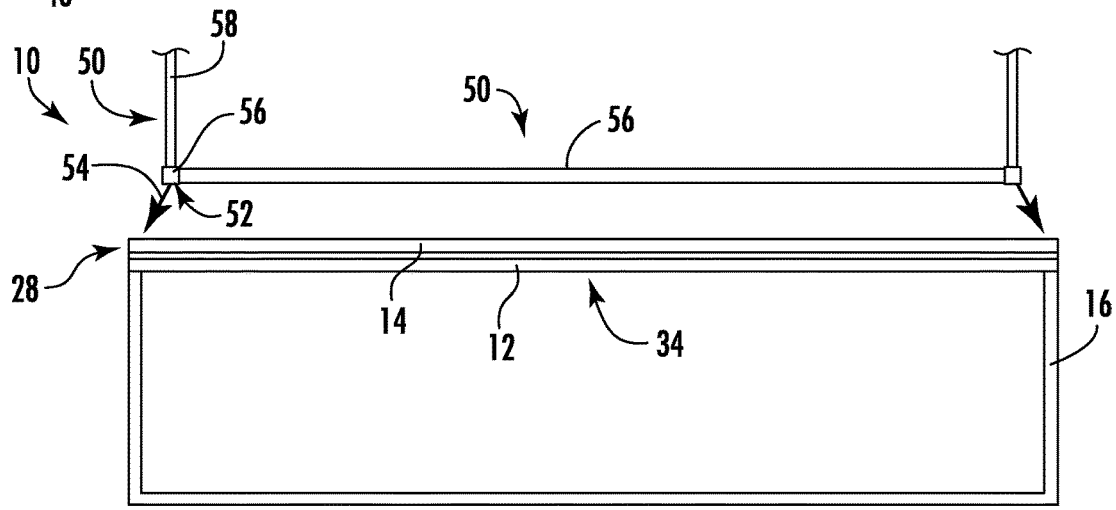
FIG. 6 is a cross-sectional view showing glass sheets supported by a bending ring including a gas manifold positioned to direct gas toward an edge region of the glass sheets, according to an exemplary embodiment.
Figure 7:
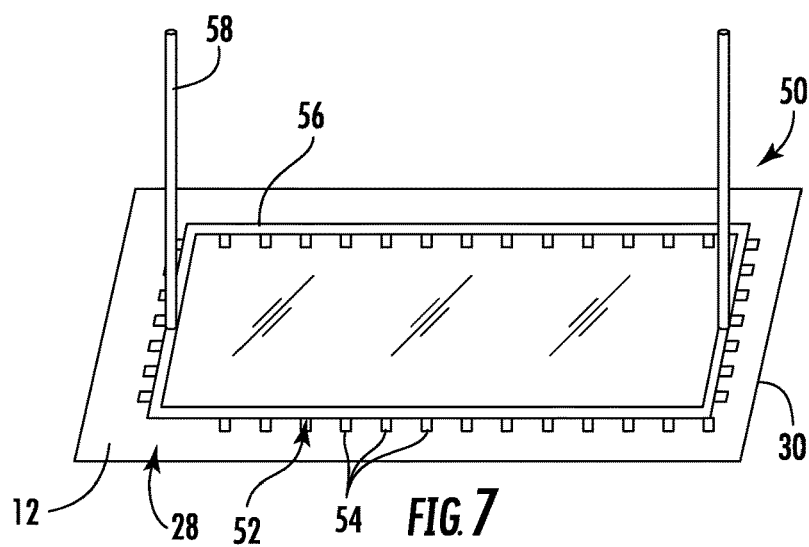
FIG. 7 is a perspective view of the gas manifold of FIG. 6 positioned adjacent to a glass sheet, according to an exemplary embodiment.

Referring to FIG. 6 and FIG. 7, system 10 may be further equipped to facilitate the differential cooling of outer region 28 of glass sheets 12 and/or 14 via gas manifold 50. Gas manifold 50 includes a plurality of nozzles 52 positioned to direct a stream of gas, shown as gas jets 54, toward outer region 28 of glass sheets 12 and/or 14 while the glass sheets are being heated within heating station 40. The moving gas of gas jets 54 convectively cools outer region 28 of glass sheets 12 and/or 14 causing the localized decrease in temperature without decreasing the temperature of central region 34. In some embodiments, gas manifold 50 is utilized alone to achieve the localized edge cooling discussed herein, and in other embodiments, gas manifold 50 is utilized in combination with high thermal mass bending ring 16 to achieve the localized edge cooling discussed herein.

As shown in FIG. 6 and FIG. 7, gas manifold 50 includes a conduit 56 generally shaped to match the shape of the outer perimeter edge 30 of glass sheets 12 and/or 14. Nozzles 52 may be formed from a plurality of perforations formed within conduit 56 in positions to direct gas jets 54 toward outer region 28. Manifold 50 includes one or more gas inlet 58 that delivers the gas from a gas supply to conduit 56.

The cooling gas delivered to outer perimeter edge 30 via manifold 50 may be a variety of gases suitable for convectively cooling outer regions 28 of glass sheets 12 and/or 14. In some embodiments, the cooling gas is at room temperature and in other embodiments is actively cooled. In other embodiments, other gases, particularly non-reactive gases, such as nitrogen or helium, may be delivered to cool the outer region 28 of glass sheets 12 and/or 14. In various embodiments, the gas type, gas temperature, gas flow rate, gas jet positioning, etc. are selected to achieve the desired temperature profile within outer region 28 of glass sheets 12 and/or 14.

Figure 8:
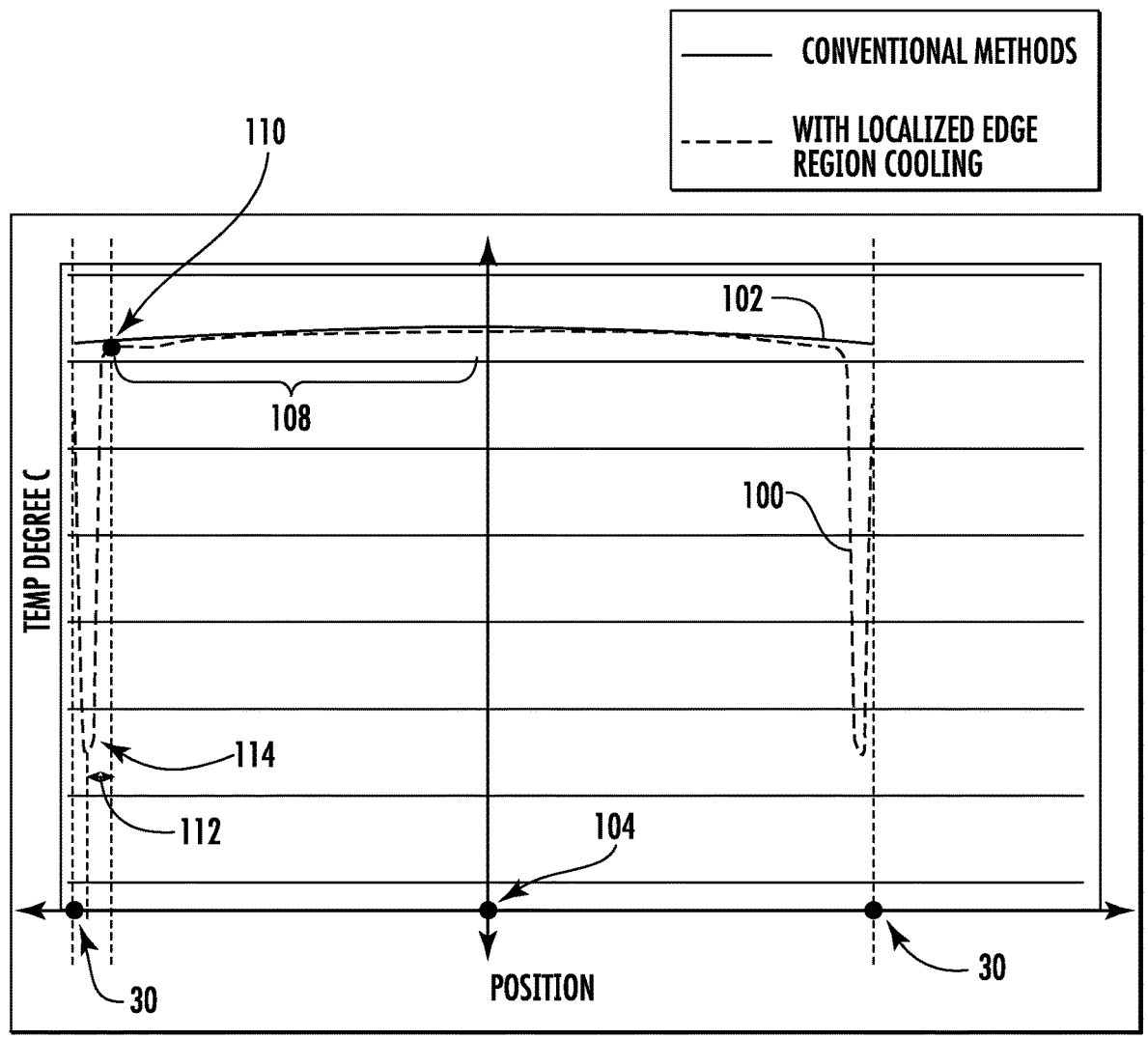
FIG. 8 is a plot showing an exemplary temperature profile demonstrating differential heating of the outer region of a glass sheet via the processes and/or systems discussed herein compared to a temperature profile of a conventional glass sagging system, according to an exemplary embodiment.

Referring to FIG. 8, a graph demonstrating the sharp edge temperature gradient generated in glass sheets 12 and/or 14 via system 10 is shown according to an exemplary embodiment. In general, FIG. 8 shows an exemplary temperature profile 100 across the width of a glass sheet (such as glass sheets 12 and/or 14) generated using one or more of the processes and/or systems discussed herein that provides for localized edge cooling of a glass sheet during heating/sagging. For comparison, FIG. 8 shows an exemplary conventional temperature profile 102 across the width of a glass sheet generated using a conventional heating/sagging system. As can be seen, conventional temperature profile 102 has a maximum temperature at glass center point 104 of central region 34 and then has a relatively gradual and consistent temperature decrease all of the way to outer perimeter edge 30 of the glass sheet. Applicant believes that a heating profile, such as profile 102, particularly when used during glass sagging operations of thin glass sheets, results in edge regions susceptible to edge wrinkle and bathtub defect as discussed herein. In general, the temperature of the glass shown along the y-axis in FIG. 8, is the average temperature of the glass sheet measured through the thickness at various positions. Further, in one embodiment, the temperature profile of FIG. 8 corresponds to a temperature profile achieved at the last heated station of a serial furnace lehr, with typical index times range from 2 min to 5 min per station.

In contrast to conventional temperature profile 102, Applicant has identified that creating a temperature profile with a sharp temperature decrease near the outer edge of the glass sheet, such as that of profile 100, decreases or eliminates the formation of edge wrinkle and/or bathtub defect particularly when sagging one or more thin sheet of glass material. In general, temperature profile 100 includes a first section 108 that extends from center point 104 of the glass sheet outward in a direction toward the outer glass sheet perimeter or edge 30. First section 108 extends a large portion, but not all of the way, from center point 104 to glass perimeter edge 30. First section 108 extends a substantial percentage of the glass sheet width (shown on the x-axis), such as at least 80%, at least 90%, at least 95%, at least 99%, etc. of the distance from center point 104 to glass sheet edge 30. The temperature profile of the glass sheet across section 108 has a first slope, shown as the temperature decrease divided by the distance from center point 104 to the outer end 110 of first section 108. Because the temperature of the glass sheet does not change much over the width of first section 108, the slope of first section 108 is relatively small.

However, temperature profile 100 includes a second section 112 that represents the temperature profile extending across outer region 28 of the glass sheet 12 (e.g., the region of the glass sheet in contact with the bending ring, the region of the glass sheet cooled via air jets, etc. as discussed in the specific embodiments herein). Second section 112 represents the temperature profile across a relatively small portion of the glass sheet width, such as less than 20%, less than 10%, less than 5%, less than 1%, etc., of the total distance from glass sheet center point 104 to outer perimeter edge 30 of the glass sheet. Specifically, second section 112 represents the temperature profile of the small portion of the glass sheet that is adjacent to outer perimeter edge 30 and located outward in the width direction from first section 108.

As shown in FIG. 8, the temperature of the glass sheet across second section 112 drops sharply over a relatively short distance. This sharp decrease in temperature at the outer region 28 of the heated, sagging glass sheet 12 and/or 14 is believed to decrease the formation of bathtub defect and/or edge wrinkle via increase in glass viscosity and stiffness of glass adjacent outer edge 30 of the glass sheet. The sharp temperature decrease within second section 112 is represented by a second slope, shown as the temperature decrease divided by the distance from the outer end 110 of first section 108 to a point of minimum temperature 114 which may be located a short distance from outer perimeter edge 30 of the glass sheet or at the outer perimeter edge 30.

The slope of section 112 is substantially larger than the slope of first section 108 representing the focused temperature differential created immediately adjacent outer edge of the glass sheet via the system(s) and processes discussed herein. In various embodiments, the average slope of section 112 is at least three times the average slope of section 108, and in specific embodiments, the average slope of section 112 is at least ten times the average slope of section 108. In even more specific embodiments, the temperature drop across first section 108 is less than 20 degrees C., and the temperature drop across second section 112 is greater than 20 degrees C., and more specifically is 30 to 40 degrees C. In such embodiments, the temperature referenced may be the average temperature through the thickness of the glass sheets at the various points at which temperature is measured. In various embodiments, the width of first section 108 (represented along the x-axis) is at least three times the width of second section 112, specifically is at least 10 times the width of second section 112, more specifically is at least 50 times the width of second section 112, and even more specifically is at least 100 times the width of second section 112 In a specific embodiment, the width of first section 108 is between 30-50 times the width of second section 112. In other specific embodiments, the width of first section 108 is greater than 50 mm, the width of second section 112 is between 3 mm and 10 mm, and the temperature decrease over second section 112 is at least 30 degrees C., and specifically is 30 to 40 degrees.

In various embodiments, the sharp drop off in temperature within section 112 is accomplished by limiting the heating experienced by the outer region of the glass sheet during the heating steps of a sag-forming process. In such embodiments, the slope or spatial temperature rate decrease across section 112 is at least 5 degrees C. per mm of glass sheet width, specifically is at least 10 degrees C. per mm of glass sheet width, and may be at least 15 degrees C. per mm of glass sheet width. This temperature differential during sag-formation, may be formed via any of the processes and systems discussed herein, including via heat transfer into a high thermal-mass bending ring, through convective cooling generate by directing gas toward an edge region of the glass sheet or through both a high thermal-mass bending ring combined with convective cooling.

As shown in FIG. 8, the sagging temperature profile 100 may be symmetric about center point 104 along at least one cross-section of the glass sheet. However, in other embodiments, temperature profile 100 may be asymmetric about center point 104 along at least one cross-section of the glass sheet, and temperature profile 100 may be different through different cross-sections across the glass sheet. In such embodiments, the asymmetric or cross-section variable temperature profile may be selected or designed based on the characteristics of a particular piece of glass being shaped (e.g., thickness, shape, material properties, etc.) in order to limit/prevent edge wrinkle and/or bathtub defect for a particular piece of glass material.

In various embodiments, glass sheets 12 and/or 14 following curve formation may be utilized in a variety of applications. In specific embodiments, the curved glass sheets produced via the systems and methods discussed herein are used to form vehicle (e.g., automotive) windows. In some such embodiments, curved glass sheets 12 and 14 are bonded together to form a glass laminate article. In some such embodiments, the systems and methods discussed herein are utilized to form a single layer, curved glass sheet that may be used as vehicle (e.g., automotive) windows. In specific embodiments, the system and method discussed herein are particularly configured to reduce defects when forming, thin, curved glass sheets. In such embodiments, the thickness of glass sheet 12 and/or 14 is less than 1 mm, specifically is 0.05 mm to 1.0 mm, and more specifically is 0.3 mm to 0.8 mm.

Examples of Glass Materials and Properties

Glass sheets 12 and/or 14 can be formed from a variety of materials. In specific embodiments, glass sheets 12 and/or 14 are formed from a chemically strengthened alkali aluminosilicate glass composition or an alkali aluminoborosilicate glass composition, and in other embodiments, glass sheets 12 and/or 14 are formed from a soda lime glass (SLG) composition.

In specific embodiments, glass sheets 12 and/or 14 are formed from a chemically strengthened material, such as an alkali aluminosilicate glass material or an alkali aluminoborosilicate glass composition, having a chemically strengthened compression layer having a depth of compression (DOC) in a range from about 30 µm to about 90 µm, and a compressive stress on at least one of the sheet's major surfaces of between 300 MPa to 1000 MPa. In some embodiments, the chemically strengthened glass is strengthened through ion exchange.

In various embodiments, glass sheets 12 and/or 14 may be formed from any of a variety of strengthened glass compositions. Examples of glasses that may be used for glass sheets 12 and/or 14 described herein may include alkali aluminosilicate glass compositions or alkali aluminoborosilicate glass compositions, though other glass compositions are contemplated. Such glass compositions may be characterized as ion exchangeable. As used herein, "ion exchangeable" means that the layer comprising the composition is capable of exchanging cations located at or near the surface of the glass layer with cations of the same valence that are either larger or smaller in size. In one exemplary embodiment, the glass composition of glass sheets 12 and/or 14 comprises $SiO_2$, $B_2O_3$ and $Na_2O$, where $(SiO_2+B_2O_3) \geq 66$ mol. %, and $Na_2O \geq 9$ mol. %. Suitable glass compositions for glass sheets 12 and/or 14, in some embodiments, further comprise at least one of $K_2O$, MgO, and CaO. In a particular embodiment, the glass compositions used in glass sheets 12 and/or 14 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example of glass composition suitable for glass sheets 12 and/or 14 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example of glass composition suitable for glass sheets 12 and/or 14 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for glass sheets 12 and/or 14 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma \text{ modifiers})>1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma \text{modifiers})>1$.

In still another embodiment, glass sheets 12 and/or 14 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, glass sheets 12 and/or 14 may comprise an alkali aluminosilicate glass composition comprising: 2 mol % or more of $Al_2O_3$ and/or $ZrO_2$, or 4 mol % or more of $Al_2O_3$ and/or $ZrO_2$. In one or more embodiments, glass sheets 12 and/or 14 comprises a glass composition comprising $SiO_2$ in an amount in the range from about 67 mol % to about 80 mol %, $Al_2O_3$ in an amount in a range from about 5 mol % to about 11 mol %, an amount of alkali metal oxides ($R_2O$) in an amount greater than about 5 mol % (e.g., in a range from about 5 mol % to about 27 mol %). In one or more embodiments, the amount of $R_2O$ comprises $Li_2O$ in an amount in a range from about 0.25 mol % to about 4 mol %, and $K_2O$ in an amount equal to or less than 3 mol %. In one or more embodiments, the glass composition includes a non-zero amount of MgO, and a non-zero amount of ZnO.

In other embodiments, glass sheets 12 and/or 14 are formed from a composition that exhibits $SiO_2$ in an amount in the range from about 67 mol % to about 80 mol %, $Al_2O_3$ in an amount in the range from about 5 mol % to about 11 mol %, an amount of alkali metal oxides ($R_2O$) in an amount greater than about 5 mol % (e.g., in a range from about 5 mol % to about 27 mol %), wherein the glass composition is substantially free of $Li_2O$, and a non-zero amount of MgO; and a non-zero amount of ZnO.

In other embodiments, glass sheets 12 and/or 14 are an aluminosilicate glass article comprising: a glass composition comprising $SiO_2$ in an amount of about 67 mol % or greater; and a sag temperature in a range from about 600° C. to about 710° C. In other embodiments, glass sheets 12 and/or 14 are formed from an aluminosilicate glass article comprising: a glass composition comprising $SiO_2$ in an amount of about 68 mol % or greater; and a sag temperature in a range from about 600° C. to about 710° C. (as defined herein).

In some embodiments, glass sheets 12 and/or 14 are formed from different glass materials from each other that differs in any one or more of composition, thickness, strengthening level, and forming method (e.g., float formed as opposed to fusion formed). In one or more embodiments, glass sheets 12 and/or 14 described has a sag temperature of about 710° C., or less or about 700° C. or less. In one or more embodiments, one of the glass sheets 12 and 14 is a soda lime glass sheet, and the other of the glass sheets 12 and 14 is any one of the non-soda lime glass materials discussed herein. In one or more embodiments, glass sheets 12 and/or 14 comprises a glass composition comprising $SiO_2$ in an amount in the range from about 68 mol % to about 80 mol %, $Al_2O_3$ in an amount in a range from about 7 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

In some embodiments, the glass composition of glass sheets 12 and/or 14 may include an oxide that imparts a color or tint to the glass articles. In some embodiments, the glass composition of glass sheets 12 and/or 14 includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

Glass sheets 12 and/or 14 may have a refractive index in the range from about 1.45 to about 1.55. As used herein, the refractive index values are with respect to a wavelength of 550 nm. Glass sheets 12 and/or 14 may be characterized by the manner in which it is formed. For instance, glass sheets 12 and/or 14 may be characterized as float-formable (i.e., formed by a float process), down-drawable and, in particular, fusion-formable or slot-drawable (i.e., formed by a down draw process such as a fusion draw process or a slot draw process). In one or more embodiments, glass sheets 12 and/or 14 described herein may exhibit an amorphous microstructure and may be substantially free of crystals or crystallites. In other words, in such embodiments, the glass articles exclude glass-ceramic materials.

In one or more embodiments, glass sheets 12 and/or 14 exhibits an average total solar transmittance of about 88% or less, over a wavelength range from about 300 nm to about 2500 nm, when glass sheets 12 and/or 14 has a thickness of 0.7 mm. For example, glass sheets 12 and/or 14 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass sheets 12 and/or 14 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass sheets 12 and/or 14 exhibits $T_{uv\text{-}380}$ or $T_{uv\text{-}400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, glass sheets 12 and/or 14 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, glass sheets 12 and/or 14 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, glass sheets 12 and/or 14 may be chemically strengthening by ion exchange. In the ion exchange process, ions at or near the surface of glass sheets 12 and/or 14 are replaced by—or exchanged with—larger ions having the same valence or oxidation state. In those embodiments in which glass sheets 12 and/or 14 comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into glass sheets 12 and/or 14 generate a stress.

Glass sheets 12 and/or 14 can be used for a variety of different applications, devices, uses, etc. In various embodiments, glass sheets 12 and/or 14 may form the sidelights, windshields, rear windows, windows, rearview mirrors, and sunroofs of a vehicle. As used herein, vehicle includes automobiles, rolling stock, locomotive, boats, ships, and airplanes, helicopters, drones, space craft and the like. In other embodiments, glass sheets 12 and/or 14 may be used in a variety of other applications where thin, curved glass sheets may be advantageous. For example, glass sheets 12 and/or 14 may be used as architectural glass, building glass, etc.

Aspect (1) of this disclosure pertains to a process for forming a curved glass article from a sheet of glass material, the process comprising: placing an outer region of the sheet of glass material into contact with a support surface of a shaping frame, the shaping frame defining an open central cavity surrounded at least in part by the support surface; supporting the sheet of glass material with the shaping frame via the contact between the sheet of glass material and the support surface such that a central region of the sheet of glass material is suspended over the open central cavity of the shaping frame; heating the sheet of glass material while supported by the shaping frame such that the central region of the sheet of glass material deforms into the open central cavity in a direction away from the support surface of the shaping frame, wherein the sheet of glass material has a spatial temperature profile measured across a width of the sheet of glass material, wherein the temperature profile comprises: a first section extending from a center point outward toward the outer region, wherein the first section of the temperature profile has a first average slope; a second section extending outward across at least a portion of the outer region, wherein the second section of the temperature profile has a second average slope; wherein the second average slope is at least three times the first average slope; and cooling the sheet of glass material following heating to form the curved glass article from the sheet of glass material.

Aspect (2) of this disclosure pertains to the process of Aspect (1), wherein a temperature decrease across the first section is less than 20 degrees C. and a temperature decrease across the second section is greater than 20 degrees C. and a width of the first section is at least three times larger than a width of the second section.

Aspect (3) of this disclosure pertains to the process of Aspect (1) or Aspect (2), wherein the second average slope is at least 10 times the first average slope.

Aspect (4) of this disclosure pertains to the process of any one of Aspects (1) through (3), wherein the different slopes of the first section and the second section of the temperature profile are created by conducting heat from the outer region of the sheet of glass material and into the shaping frame through the contact between the outer region of the sheet of glass material and the support surface.

Aspect (5) of this disclosure pertains to the process of any one of Aspects (1) through (3), wherein the different slopes of the first section and the second section of the temperature profile are created by directing a stream of gas onto the outer region of the sheet of glass material.

Aspect (6) of this disclosure pertains to the process of any one of Aspects (1) through (3), wherein the different slopes of the first section and the second section of the temperature profile are created both by conducting heat from the outer region of the sheet of glass material and into the shaping frame through the contact between the outer region of the sheet of glass material and the support surface and by directing a stream of gas onto the outer region of the sheet of glass material.

Aspect (7) of this disclosure pertains to the process of any one of Aspects (1) through (6), wherein a width of the second section is between 3 mm and 10 mm, and a width of the first section is greater than 50 mm, and wherein a temperature decrease over the width of the second section is at least 30 degrees C.

Aspect (8) of this disclosure pertains to the process of any one of Aspects (1) through (7), wherein the shaping frame is formed from a material having a low thermal diffusivity.

Aspect (9) of this disclosure pertains to the process of Aspect (8), wherein the low thermal diffusivity is less than $2 \times 10^{-5}$ m$^2$/s.

Aspect (10) of this disclosure pertains to the process of Aspect (8), wherein the low thermal diffusivity is less than $4 \times 10^{-6}$ m$^2$/s.

Aspect (11) of this disclosure pertains to the process of any one of Aspects (1) through (10), wherein the shaping frame comprises a wall surrounding the open central cavity, the wall including an upper surface defining the support surface, an inner surface defining the open central cavity, an outer surface opposite the inner surface and a bottom surface opposite the support surface, wherein an average width of the wall measured between the inner and outer surfaces is greater than 3 mm and an average height of the wall measured between the support surface and the bottom surface is greater than 20 mm.

Aspect (12) of this disclosure pertains to a process for forming a curved glass article from a sheet of glass material, the process comprising: placing an outer region of the sheet of glass material into contact with a support surface of a shaping frame, the shaping frame defining an open central cavity surrounded at least in part by the support surface; supporting the sheet of glass material with the shaping frame via the contact between the sheet of glass material and the support surface such that a central region of the sheet of glass material is suspended over the open central cavity of the shaping frame; heating the sheet of glass material while supported by the shaping frame such that the central region of the sheet of glass material deforms into the open central cavity in a direction away from the support surface of the shaping frame; limiting heating experienced by the outer region of the sheet of glass material such that the temperature of the outer region decreases in a direction toward an outer perimeter of the glass sheet at a spatial rate greater than 5 degrees C. per mm; and cooling the sheet of glass material following heating to form the curved glass article from the sheet of glass material.

Aspect (13) of this disclosure pertains to the process of Aspect (12), wherein the average temperature experienced by the outer region of the sheet of glass material is at least 30 degrees C. less than the average temperature experienced by the central region of the sheet of glass material during the heating step.

Aspect (14) of this disclosure pertains to the process of Aspect (12) or Aspect (13), wherein the limiting heating step comprises conducting heat from the outer region of the sheet of glass material and into the shaping frame through the contact between the outer region of the sheet of glass material and the support surface.

Aspect (15) of this disclosure pertains to the process of Aspect (12) or Aspect (13), wherein the limiting heating step comprises directing a stream of gas onto the outer region of the sheet of glass material.

Aspect (16) of this disclosure pertains to the process of Aspect (12) or Aspect (13), wherein the limiting heating step comprises conducting heat from the outer region of the sheet of glass material and into the shaping frame through the contact between the outer region of the sheet of glass material and the support surface and by directing a stream of gas onto the outer region of the sheet of glass material.

Aspect (17) of this disclosure pertains to the process of any one of Aspects (12) through (16), wherein the outer region has a width between 3 mm and 10 mm, and the central region has a width greater than 50 mm.

Aspect (18) of this disclosure pertains to the process of any one of Aspects (12) through (17), wherein the shaping frame is formed from a material having a low thermal diffusivity.

Aspect (19) of this disclosure pertains to the process of Aspect (18), wherein the low thermal diffusivity is less than $2 \times 10^{-5}$ m$^2$/s.

Aspect (20) of this disclosure pertains to the process of Aspect (19), wherein the low thermal diffusivity is less than $4 \times 10^{-6}$ m$^2$/s.

Aspect (21) of this disclosure pertains to the process of any one of Aspects (12) through (20), wherein the shaping frame comprises a wall surrounding the open central cavity, the wall including an upper surface defining the support surface, an inner surface defining the open central cavity, an outer surface opposite the inner surface and a bottom surface opposite the support surface, wherein an average width of the wall measured between the inner and outer surfaces is greater than 3 mm and an average height of the wall measured between the support surface and the bottom surface is greater than 20 mm.

Aspect (22) of this disclosure pertains to the process of any one of Aspects (12) through (20), wherein the shaping frame comprises a wall having an upper surface defining the support surface, an inner surface defining the open central cavity, an outer surface opposite the inner surface and a bottom surface opposite the support surface, wherein the wall has a tapered shape such that an average outer width measured across the support surface is less than an average outer width measured across the bottom surface.

Aspect (23) of this disclosure pertains to the process of Aspect (22), wherein the wall is formed from a solid contiguous section of metal material.

Aspect (24) of this disclosure pertains to the process of Aspect (22), wherein the wall is formed from a plurality of panels removably coupled together to form the wall.

Aspect (25) of this disclosure pertains to the process of any one of Aspects (12) through (24), wherein gravity causes the deformation of the sheet of glass material during heating and the support surface is an upward facing surface.

Aspect (26) of this disclosure pertains to the process of any one of Aspects (12) through (25), wherein the sheet of glass material is sized to form an automobile window.

Aspect (27) of this disclosure pertains to the process of any one of Aspects (12) through (26), wherein the sheet of glass material has an average thickness less than 1 mm.

Aspect (28) of this disclosure pertains to a system for forming a curved glass article from a glass sheet, the system comprising: a support ring comprising a radially inward facing inner surface defining an open central cavity, a radially outward facing surface, an upper surface surrounding the open central cavity at an upper end of the support ring, and a bottom surface opposite the upper surface, wherein the glass sheet is supported from the upper surface of the support ring with a central region of the glass sheet suspended over the open central cavity of the support ring; and a heating station having a heating chamber, the support ring located within the heating chamber and the heating station configured to heat the support ring and the glass sheet such that a central region of the glass sheet sags downward into the open central cavity under gravity, wherein the system is configured to conduct heat away from the sheet of glass material such that the temperature experienced by the portion of the sheet of glass material in contact with the upper surface of the support ring is at least 30 degrees less than the temperature experienced by the central region of the sheet of glass material.

Aspect (29) of this disclosure pertains to the system of Aspect (28), wherein the support ring is configured to conduct heat away from the sheet of glass material through the contact at the upper surface with the sheet of glass material to generate the temperature differential.

Aspect (30) of this disclosure pertains to the system of Aspect (28) or Aspect (29), further comprising a plurality of gas nozzles positioned relative to the support frame such that the plurality of gas nozzles direct gas toward the upper surface of the support frame to cool an outer region of the sheet of glass material via convection during heating to generate the temperature differential.

Aspect (31) of this disclosure pertains to the system of any one of Aspects (28) through Aspect (30), wherein the support ring is formed from a material having a low thermal diffusivity.

Aspect (32) of this disclosure pertains to the system of Aspect (31), wherein the low thermal diffusivity is less than $2\times10^{-5}$ m$^2$/s.

Aspect (33) of this disclosure pertains to the system of Aspect (32), wherein the low thermal diffusivity is less than $4\times10^{-6}$ m$^2$/s.

Aspect (34) of this disclosure pertains to the system of any one of Aspects (28) through (33), wherein an average width of the support ring measured between the radially inward facing surface and the radially outward facing surface is greater than 3 mm and an average height of the support ring measured between the upper surface and the bottom surface is greater than 20 mm.

Aspect (35) of this disclosure pertains to the system of any one of Aspects (28) through (34), wherein the support ring has a tapered shape such that an average outer width measured across the upper surface is less than an average outer width measured across the bottom surface.

Aspect (36) of this disclosure pertains to the system of any one of Aspects (28) through (35), wherein the support ring is formed from a solid contiguous section of metal material.

Aspect (37) of this disclosure pertains to the system of any one of Aspects (28) through (35), wherein the support ring is formed from a plurality of panels removably coupled together to define the support ring.

Aspect (38) of this disclosure pertains to the system of any one of Aspects (28) through (35), wherein the support ring includes a reflective coating applied to one or more exterior surface of the support such that the support ring has an emissivity of 0.4 or less.

Aspect (39) of this disclosure pertains to a curved glass article made by the method(s) and/or system(s) disclosed herein, made by the method(s) of any one of Aspects (1) through (27) or or made by the system of any one of Aspects (28) through (38).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A process for forming a curved glass article from a sheet of glass material, the process comprising:
    placing an outer region of the sheet of glass material into contact with a support surface of a shaping frame, the shaping frame being formed from a material having a thermal diffusivity that is less than $4\times10^{-5}$ m$^2$/s and defining an open central cavity surrounded at least in part by the support surface;
    supporting the sheet of glass material with the shaping frame via the contact between the sheet of glass material and the support surface such that a central region of the sheet of glass material is suspended over the open central cavity of the shaping frame;
    heating the sheet of glass material while supported by the shaping frame such that the central region of the sheet of glass material deforms into the open central cavity in a direction away from the support surface of the shaping frame, wherein the sheet of glass material has a spatial temperature profile measured across a width of the sheet of glass material, the spatial temperature profile being achieved during a last stage of the heating, wherein the spatial temperature profile comprises:
        a first section extending from a center point outward toward the outer region to an outer end of the first section, wherein the first section of the temperature profile has a first average slope in terms of temperature as a function of position;
        a second section extending outward from the outer end across at least a portion of the outer region, wherein the second section of the temperature profile has a second average slope in terms of temperature as a function of position;
        wherein the second average slope is at least three times the first average slope; and
    cooling the sheet of glass material following heating to form the curved glass article from the sheet of glass material, wherein the second average slope is at least 10 times the first average slope.

2. The process of claim 1, wherein a temperature decrease across the first section is less than 20 degrees C. and a temperature decrease across the second section is greater than 20 degrees C. and a width of the first section is at least three times larger than a width of the second section.

3. The process of claim 1, wherein the different slopes of the first section and the second section of the temperature profile are created by conducting heat from the outer region of the sheet of glass material and into the shaping frame through the contact between the outer region of the sheet of glass material and the support surface.

4. The process of claim 1, wherein the different slopes of the first section and the second section of the temperature profile are created by directing a stream of gas onto the outer region of the sheet of glass material.

5. The process of claim 1, wherein the different slopes of the first section and the second section of the temperature profile are created both by conducting heat from the outer region of the sheet of glass material and into the shaping frame through the contact between the outer region of the sheet of glass material and the support surface and by directing a stream of gas onto the outer region of the sheet of glass material.

6. The process of claim 1, wherein a width of the second section is between 3 mm and 10 mm, and a width of the first section is greater than 50 mm, and wherein a temperature decrease over the width of the second section is at least 30 degrees C.

7. The process of claim 1, wherein the thermal diffusivity is less than $2\times10^{-5}$ m$^2$/s.

8. The process of claim 1, wherein the shaping frame comprises a wall surrounding the open central cavity, the wall including an upper surface defining the support surface, an inner surface defining the open central cavity, an outer surface opposite the inner surface and a bottom surface opposite the support surface, wherein an average width of the wall measured between the inner and outer surfaces is greater than 3 mm and an average height of the wall measured between the support surface and the bottom surface is greater than 20 mm.

9. A process for forming a curved glass article from a sheet of glass material, the process comprising:
   placing an outer region of the sheet of glass material into contact with a support surface of a shaping frame, the shaping frame being formed from a material having a thermal diffusivity that is less than $4\times10^{-5}$ m$^2$/s and defining an open central cavity surrounded at least in part by the support surface;
   supporting the sheet of glass material with the shaping frame via the contact between the sheet of glass material and the support surface such that a central region of the sheet of glass material is suspended over the open central cavity of the shaping frame;
   heating the sheet of glass material while supported by the shaping frame such that the central region of the sheet of glass material deforms into the open central cavity in a direction away from the support surface of the shaping frame, wherein the sheet of glass material has a spatial temperature profile measured across a width of the sheet of glass material, the spatial temperature profile being achieved during a last stage of the heating, wherein the spatial temperature profile comprises:
      a first section extending from a center point outward toward the outer region to an outer end of the first section, wherein the first section of the temperature profile has a first average slope in terms of temperature as a function of position;
      a second section extending outward from the outer end across at least a portion of the outer region, wherein the second section of the temperature profile has a second average slope in terms of temperature as a function of position;
      wherein the second average slope is at least three times the first average slope; and
   cooling the sheet of glass material following heating to form the curved glass article from the sheet of glass material, wherein the different slopes of the first section and the second section of the temperature profile are created by conducting heat from the outer region of the sheet of glass material and into the shaping frame through the contact between the outer region of the sheet of glass material and the support surface.

10. A process for forming a curved glass article from a sheet of glass material, the process comprising:
   placing an outer region of the sheet of glass material into contact with a support surface of a shaping frame, the shaping frame being formed from a material having a thermal diffusivity that is less than $4\times10^{-5}$ m$^2$/s and defining an open central cavity surrounded at least in part by the support surface;
   supporting the sheet of glass material with the shaping frame via the contact between the sheet of glass material and the support surface such that a central region of the sheet of glass material is suspended over the open central cavity of the shaping frame;
   heating the sheet of glass material while supported by the shaping frame such that the central region of the sheet of glass material deforms into the open central cavity in a direction away from the support surface of the shaping frame, wherein the sheet of glass material has a spatial temperature profile measured across a width of the sheet of glass material, the spatial temperature profile being achieved during a last stage of the heating, wherein the spatial temperature profile comprises:
      a first section extending from a center point outward toward the outer region to an outer end of the first section, wherein the first section of the temperature profile has a first average slope in terms of temperature as a function of position;
      a second section extending outward from the outer end across at least a portion of the outer region, wherein the second section of the temperature profile has a second average slope in terms of temperature as a function of position;
      wherein the second average slope is at least three times the first average slope; and
   cooling the sheet of glass material following heating to form the curved glass article from the sheet of glass material, wherein the shaping frame comprises a wall surrounding the open central cavity, the wall including an upper surface defining the support surface, an inner surface defining the open central cavity, an outer surface opposite the inner surface and a bottom surface opposite the support surface, wherein an average width of the wall measured between the inner and outer surfaces is greater than 3 mm and an average height of the wall measured between the support surface and the bottom surface is greater than 20 mm.

* * * * *